United States Patent [19]

Eccles

[11] Patent Number: 5,895,832
[45] Date of Patent: *Apr. 20, 1999

[54] PROCESS FOR THE TREATMENT OF CONTAMINATED MATERIAL

[75] Inventor: Harry Eccles, Preston, United Kingdom

[73] Assignee: British Nuclear Fuels Plc., Warrington, United Kingdom

[ * ] Notice: This patent issued on a continued prosecution application filed under 37 CFR 1.53(d), and is subject to the twenty year patent term provisions of 35 U.S.C. 154(a)(2).

[21] Appl. No.: 08/693,069

[22] PCT Filed: Feb. 13, 1995

[86] PCT No.: PCT/GB95/00285

§ 371 Date: Oct. 3, 1996

§ 102(e) Date: Oct. 3, 1996

[87] PCT Pub. No.: WO95/22374

PCT Pub. Date: Aug. 24, 1995

[30] Foreign Application Priority Data

Feb. 16, 1994 [GB] United Kingdom ............. 9402973
Jul. 16, 1994 [GB] United Kingdom ............. 9414426

[51] Int. Cl.⁶ .................. A62D 3/00; B09B 3/00
[52] U.S. Cl. .......... 588/231; 405/263; 435/262.5; 588/236; 423/DIG. 17
[58] Field of Search ........ 423/DIG. 17; 588/231, 588/236; 435/262.5; 405/128, 129, 263

[56] References Cited

U.S. PATENT DOCUMENTS

| | | |
|---|---|---|
| 4,108,722 | 8/1978 | Stoven . |
| 4,155,982 | 5/1979 | Hunkin et al. ............. 432/7 |
| 4,200,523 | 4/1980 | Balmat .......................... 210/4 |
| 4,354,942 | 10/1982 | Kaczur et al. ............ 210/712 |
| 4,376,098 | 3/1983 | Yan ............................. 423/20 |
| 4,401,569 | 8/1983 | Jhaveri et al. ............ 210/610 |
| 4,522,723 | 6/1985 | Kauffman et al. ........ 210/611 |
| 4,789,478 | 12/1988 | Revies et al. ............ 210/611 |
| 5,076,927 | 12/1991 | Hunter ..................... 210/603 |
| 5,155,042 | 10/1992 | Lupton et al. .......... 435/262.5 |
| 5,202,033 | 4/1993 | Stanforth et al. ........ 210/747 |
| 5,217,615 | 6/1993 | Tyagi et al. .............. 210/611 |
| 5,250,102 | 10/1993 | Barnes et al. ....... 423/DIG. 17 |
| 5,263,795 | 11/1993 | Corey et al. ............... 405/128 |
| 5,316,751 | 5/1994 | Kingsley et al. ........... 423/571 |
| 5,324,433 | 6/1994 | Grant et al. .............. 210/634 |
| 5,348,662 | 9/1994 | Yen et al. ................. 210/717 |
| 5,431,825 | 7/1995 | Diel ......................... 210/719 |
| 5,449,397 | 9/1995 | Hunter et al. ...... 423/DIG. 17 |

FOREIGN PATENT DOCUMENTS

| | | |
|---|---|---|
| 436254 | 7/1991 | European Pat. Off. . |
| 2651673 | 2/1980 | Germany . |
| 290408 | 10/1983 | Germany . |
| 3300402 | 10/1984 | Germany . |
| 249155 | 9/1987 | Germany . |
| 4117515 | 12/1992 | Germany . |
| 9067299 | 3/1989 | Japan . |
| WO 94/03403 | 2/1994 | WIPO . |

*Primary Examiner*—Gary P. Straub
*Attorney, Agent, or Firm*—Sheridan Ross P.C.

[57] ABSTRACT

A process for the decontamination of a medium comprising a particulate material contaminated with one or more metal species, the process comprising the steps of treating a body of the said medium with microbially produced sulfuric acid so as to solubilize the metal species as a metal sulfate; treating the leached metal sulfate by a bioprecipitation process which converts the said sulfate to an insoluble sulfide; separating hydrogen sulfide produced during the bioprecipitation from the insoluble metal sulfide; and oxidizing the separated hydrogen sulfide to form a reusable source of a sulfur-containing ingredient.

11 Claims, 1 Drawing Sheet

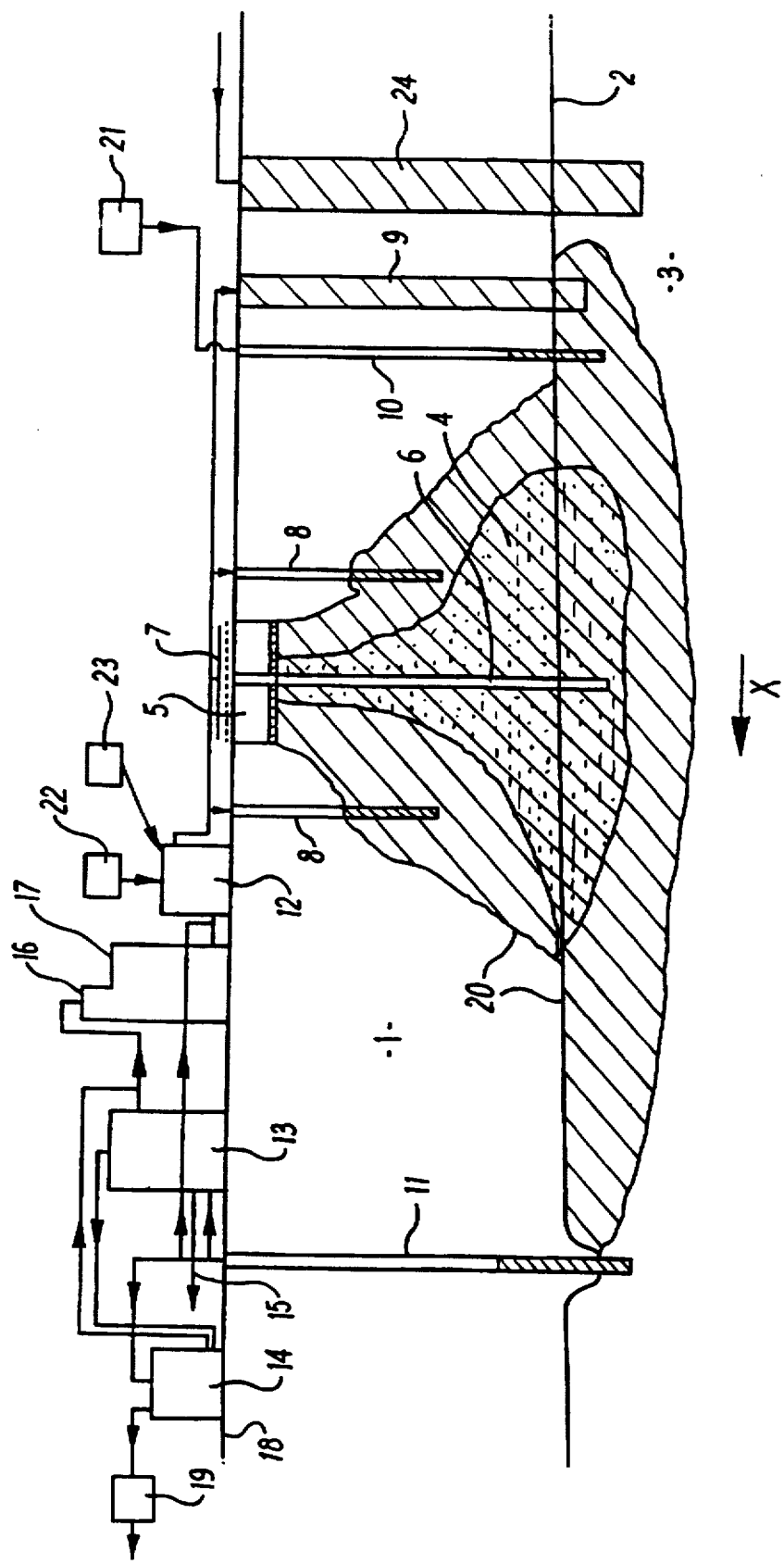

5,895,832

1

PROCESS FOR THE TREATMENT OF CONTAMINATED MATERIAL

FIELD OF THE INVENTION

The present invention relates to a process for the treatment of contaminated material, in particular a process for the removal of metal, especially heavy metal, contaminants from bulk particulate material such as land or soil using biochemical processes.

BACKGROUND OF THE INVENTION

World-wide, substantial amounts of land have become metal contaminated as a result of industrial, waste disposal and other activities. Examples of such contaminants include: mercury, cadmium, barium, chromium, manganese and lead, radionuclides such as actinides and fission products. Such contaminants can pose a significant threat to ground water and therefore drinking water supplies and in many cases either limit, or prevent land re-use. Additionally, as a result of recent legislation in the United States of America and likely similar legislation within the European Community and elsewhere, waste producers are becoming increasingly liable to prosecution and to meet the costs of recovery and clean up if they do not act responsibly towards their wastes. Consequently there is a growing need for technologies which can help solve the problems caused by contaminated land.

To date, a number of techniques have been developed to remediate contaminated land. Examples include: soil stabilization, electromigration, vitrification, volatilization, incineration, soil washing, pump and treat systems, land farming, slurry phase bioremediation, etc. Many of these known techniques possess several limitations including:

a) Lack of a permanent solution to the problem, e.g. transferral of the material to a toxic landfill, or entrapment within matrixes possessing a limited life;

b) Unsuitability to treat a wide range of contaminants, e.g. metal contaminated land in the case of currently used biological processes;

c) The generation of high volume, or difficult to control secondary wastes, e.g. soil stabilization and incineration;

d) Lack of selectivity of in-situ or ex-situ options as appropriate to a particular site, e.g. as in the case of incineration and soil washing;

e) High costs, e.g. incineration, vitrification and pump and treat systems;

f) Limited ability to re-use contaminants, e.g. soil stabilization systems when applied to metals.

The present invention seeks to address these problems by enabling biological systems to remediate metal contaminated land non-specifically.

SUMMARY OF THE PRESENT INVENTION

According to the present invention a process for the decontamination of a medium comprising a particulate material contaminated with one or more metal species comprises the steps of treating a body of the said medium with microbially produced sulfuric acid so as to solubilize and leach the metal species as a metal sulfate; treating the leached metal sulfate by a bioprecipitation process which converts the said sulfate to an insoluble sulfide; separating hydrogen sulfide produced during bioprecipitation from the insoluble metal sulfide; and oxidizing the separated hydrogen sulfide to form a reusable source of a sulfur-containing ingredient.

2

The medium to be decontaminated may comprise a particulate material such as soil, rock particles, dredgings, sediments, sludges, process residues, slags from pyrolytic processes, furnace dusts and the like. The contaminants may be contained on the surface of the particulate material or may be bound inside the particles thereof.

Several metal species may be present in the said medium and these may be converted to various metal sulfates and subsequently bioprecipitated as various metal sulfides. The term "metal species" as used herein includes metals, alloys, metal salts, metalloids and metal containing compounds and complexes.

The said metal species contaminants may include:

i) actinides or their radioactive decay products or compounds thereof;

ii) fission products;

iii) heavy metals or compounds thereof.

Actinides are elements having periodic numbers in the inclusive range 89 to 104.

The term 'fission product' as used herein refers to those elements formed as direct products (or so-called 'fission fragments') in the fission of nuclear fuel and products formed from such direct products by beta decay or internal transitions. Fission products include elements in the range from selenium to cerium.

Non-radioactive heavy metals desired to be separated by the process of the present invention include toxic metals such as nickel, zinc, cadmium, copper and cobalt and other common contaminants. These are commonly found as earth contaminants or in aquatic sediments near industrial plants in which chemicals containing those elements have been employed, and on waste disposal sites. The metallic contaminants separated in the process of the present invention may include a mixture of radioactive and non-radioactive metallic contaminants.

As described below, the process of the present invention may be extended to include steps in which organic contaminants in the medium to be treated are also removed or detoxified.

The particulate material desirably is treated by leaching with the biologically produced sulfuric acid using an added aqueous solution.

Where the medium to be decontaminated comprises soil or land, the soil or land may be treated in-situ or ex-situ. In the latter case the soil may be pre-treated e.g. to remove or crush large objects eg boulders, stones and the like. A suitable mixture of an aqueous solution containing biologically produced sulfuric acid and/or a source of sulfurous material bioconvertible into sulfuric acid may be injected into or mixed with the soil. Other ingredients such as nitrogen-rich or phosphorus-rich materials and air may optionally be added. Bioconversion to form sulfuric acid may be carried out in a known way by microbial agents present in the soil. The sulfurous material may comprise either elemental sulfur or another reduced form of sulfur.

Where the soil or other particulate material, e.g. process residues or slag, is to be treated ex-situ, it may be treated in one or more suitable known bioreactors. The aforementioned ingredients may be added to promote acid production.

Where the bioconversion to produce sulfate ions is carried out in the soil to be treated, it may be brought about by the action of naturally occurring sulfur oxidizing organisms including: *Thiobacillus ferooxidans, Thiobacillus thiooxidans* and *Thiobacillus neapolitanus*. These organisms may, for instance, be present as a consortium. These organisms obtain the energy necessary for their growth by the oxidation of reduced forms of sulfur thereby producing sulfates and sulfuric acid, or by the oxidation of ferrous iron to ferric iron. If the soil is deficient in appropriate micro-organisms, or if the particulate material is to be treated in a separate bioreactor, then these micro-organisms may be added as a mixed consortium obtained from similar soil environments.

In addition to acid leaching mentioned above metal release can occur by one or more of the following mechanisms:

a) direct attack of metal sulfides;
b) by electrochemical processes (galvanic conversion), resulting from contact between two dissimilar metal species immersed in a suitable electrolyte, e.g. sulfuric acid; or
c) by the oxidative effect of ferric sulfate.

As an alternative, the sulfuric acid required for the leaching step in the process embodying present invention may be produced chemically or biochemically in a separate bioreactor and added to the soil or other particulate material after production.

During process start up, elemental sulfur, or sulfuric acid (bypassing in-situ biological acid production), may be used as the acid source for leaching. Thereafter, elemental sulfur, or a combination of elemental sulfur and sulfuric acid, will be the major sulfur source. Elemental sulfur or sulfuric acid may be added to replace the available sulfur lost from the system, as metal sulfides.

The leachate solution may be allowed to percolate through and drain from the body of particulate material and be collected.

The leachate solution so collected may then be either re-circulated through the particulate material or pumped into a reactor to carry out the bioprecipitation stage of the process.

The bioprecipitation stage employed in the process of the present invention may be similar to known sulfate reduction processes. Such processes have, for example, been used in the prior art to treat both sulfates and heavy metals, either alone or in combination, removed from waste waters. For example, the process described in EP 426254A which employs both ethanol as a substrate and methanogenic organisms to convert anaerobically produced acetate to methane is suitable. Additionally, such processes occur naturally within many anaerobic environments.

The bioprecipitation process in the present invention may employ a naturally occurring consortium of disimulatory sulfate reducing bacteria (SRBs), to convert aqueous metal sulfates to metal sulfides. Micro-organisms responsible for this transformation include: species of Desulfovibrio and Desulfomonas and may be grown in an enclosed above ground bioreactor system. These organisms oxidize simple organic compounds such as lactic acid and ethanol, to derive the energy necessary for their growth. However, more complex carbon sources can occasionally be used, e.g. phenolic compounds, or possibly organic materials leached from the soil during bioleaching. As a consequence of this oxidation, sulfates are reduced to sulfides and water. As the sulfides of many heavy metals possess low solubilities in aqueous solution, these precipitate together with some biomass as a sludge within the reactor. The metal sulfides will normally be separated as sludge and may be sold for metal recovery, or in the case of toxic or radioactive metals, further immobilised in a subsequent process.

Reduction of sulfuric acid entering the bioprecipitation reactor from the metal dissolving phase will result in the production of hydrogen sulfide and a consequent reduction in the sulfuric acid concentration. This will result in the maintenance of a pH close to neutrality within the bioprecipitation reactor and thus, an optimal pH for SRB activity. Additionally, the substantially neutral pH will cause hydrogen sulfide to remain in solution, thus maintaining a sufficiently low redox potential for SRB viability, i.e. $<-300$ mV. The maintenance of a suitable redox potential by this method is common. Although the procedure has previously been used to maintain a suitable reactor pH (e.g. as in EP 436254A), it has not previously been used to buffer against influent flows as low as pH 1.0 as might be encountered from the acid leaching step described herein.

As a result of the production of hydrogen sulfide and metal sulfides during bioprecipitation, three different product streams may arise from the bioprecipitation process:

(a) sludge containing precipitated metal sulfides and biomass;
(b) aqueous hydrogen sulfide and soluble metal sulfides together with some biomass components;
(c) gaseous hydrogen sulfide.

Gaseous hydrogen sulfide may be extracted by a venting means provided at or near to the top of the reactor. Aqueous hydrogen sulfide and other soluble sulphides may be separated from the sludge.

The metal sulfide sludge may be removed separately via a suitable drain in the reactor. The sludge may be dewatered and recycled for metal recovery or may be treated by a suitable encapsulation process, e.g. a biologically enhanced metal fixation.

The gaseous and aqueous hydrogen sulfide extracted is a valuable source of re-usable sulfur and may be utilized by the biochemical oxidation process described hereinafter.

During the initial operation of the metal leaching stage of the process according to the present invention, the leachate entering bioprecipitation will possess a substantially neutral pH. Therefore, a portion of this liquor can be used to dissolve the gaseous hydrogen sulfide effluent produced from bioprecipitation.

The two aqueous hydrogen sulfide streams derived from bioprecipitation may be employed separately or combined and may be oxidized within an enclosed bioreactor system. The bioreactor system may contain a consortium of naturally occurring sulfide oxidising organisms. Examples of micro-organisms known to oxidise soluble sulfides include: *Thiobacillus thioparus, T. neapolitanus, T. dentificans* and Thiomicrospira species. Two routes are possible for sulfide oxidation:

(a) direct oxidation to sulfuric acid and/or sulfates;
(b) oxidation to elemental sulfur, which can if appropriate then be added to, e.g. spread on, the contaminated soil to produce sulfuric acid.

Oxidation to elemental sulfur requires an oxygen limited environment, but possesses the advantage of providing a sulfide-free, pH-neutral liquor that can be used to dissolve effluent hydrogen sulfide gas from bioprecipitation. The sulfuric acid liquor produced by direct oxidation is more versatile for use in subsequently contacting the contaminated soil.

The process of the present invention may be extended to include one or more steps for the removal of organic contaminants from the said contaminated medium, and this may be by a biodegradation process employed in conjunction with the metal removal process as described in Applicants' copending UK Patent Application Nos. 9402975.8 and 9414425.0 (which process is the subject of a copending PCT application of even date herewith).

The present invention offers the following further advantages over prior art processes: (1) It provides a permanent solution to the contamination problem. (2) It allows the simultaneous treatment of metal and organic contaminants. (3) In-situ and ex-situ treatment systems can be available and selected as appropriate. (4) The size of the secondary waste streams and therefore the cost of dealing with them is minimized. (5) It minimizes the use of harsh chemicals which could harm the environment. (6) An opportunity to re-use certain metal contaminants may be offered.

BRIEF DESCRIPTION OF THE FIGURES

Embodiments of the present invention will now be described by way of example with reference to the accompanying drawings, in which:

FIG. 1 is a diagrammatic cross-sectional view of a region of land being treated in-situ to provide remediation thereof by a process embodying the present invention together with equipment used in the process.

DETAILED DESCRIPTION OF THE INVENTION

As shown in FIG. 1, a region of land to be treated comprises a layer 1 of soil overlying an underground aquifer 3 below a level 2. The layer 1 incorporates a metal contaminated region 4 which has been produced by migration of contaminants from a waste sump 5 provided in the surface of the layer 1. The region 4 extends into the aquifer 3. A monitoring well 6 projects downward through the region 4 to enable measurements on the extent of contamination in the region 4 to be determined. The depth and dimensions of the contaminated region 4 have previously been determined using appropriate known analytical techniques. Ground level is indicated by numeral 18.

Nutrients from a nutrient source 22 and acid which may be carried in a suitable carrier liquid, e.g. aerated water, are applied to the base of the empty sump 5. This application is carried out by a sprayer 7. This liquid is also applied via appropriately positioned injection wells 8 and through an infiltration gallery 9, so as to permeate through the material in the contaminated region and promote soil acidification. Elemental sulfur may also be added to and mixed into areas of shallow contamination such as the base of the sump 5 further to promote in-situ bioleaching as described above.

In order to enable aerobic conditions to be developed and maintained within the contaminated region 4, air is blown by an air blower 21 attached to a series of vent wells 10, (one of which is shown) either to draw air through the contaminated region 4 in the layer 1 or to inject air into the ground water in the aquifer 3 or both. Additionally, the rate of nutrient addition may be varied to avoid the creation of anaerobic conditions within the contaminated region 4. The plume or region in the layer 1 and aquifer 3 supplied with nutrients and acid is indicated by reference 20. This plume encompasses the contaminated region 4 in the layer 1 and aquifer 3.

This treatment produces acid metal leaching in the region 4 in the manner described above. This may continue over weeks or months until the soil in the contaminated region 4 is substantially free of contaminating metals as determined from time-to-time by suitable analysis.

The products of the metal leaching treatment are collected within a portion of the aquifer 3, either naturally occurring or artificially created in a direction X, and are received by and returned to the surface above the layer 1 via a series of recovery wells 11 (one shown) using appropriate pumps (not shown). The level 2 of the aquifer 3 may be adjusted by addition of water through an infiltration gallery 24 to assist water flow in the direction X.

The collected liquor is then delivered to a selected one of:

(a) a buffer tank 12 for aeration and addition of appropriate nutrients before re-application to the contaminated area. This is the principal route during initial operation of the process;

(b) a bioprecipitation reactor 13;

(c) a gas liquid contactor 14 to scrub hydrogen sulfide from the gaseous effluent from bioprecipitation.

Liquor enters the reactor 13 at its base and flows upward through the reactor 13. As it does so, sulfate reducing organisms present in the reactor 13 convert the influent sulfates to sulfides in the manner described above.

The gaseous effluent produced during bioprecipitation in the reactor 13 is passed through the gas liquid contactor 14 connected to the reactor 13. The contactor 14 permits hydrogen sulfide recovery. The gas stream leaving the contactor 14 is passed through a secondary scrubber unit 19 and discharged to atmosphere.

Bioprecipitated sludge containing insoluble sulfides is collected in the base of the reactor 13 and transferred via a pipeline 15 to a separate treatment process, e.g. biologically enhanced metal fixation or is dewatered and collected and delivered to another site for metal recovery. The liquor obtained by dewatering the sludge may either be returned for re-use in the bioleaching process, or further treated and discharged.

The effluent liquor containing dissolved sulfides arising from bioprecipitation is extracted and combined with the aqueous sulfide stream arising from the gas/liquid contactor 14. The combined aqueous sulfide stream is then pumped through a gas/liquid contactor 16 and into a sulfide oxidation reactor 17. Contactor 16 ensures that any gaseous hydrogen sulfide released by acid in the reactor 17 is re-dissolved by the alkaline influent liquor.

Within the oxidation reactor 17, the sulfide containing liquor is intimately mixed with suitable micro-organisms and oxidised to sulfate in the manner described above. The acid liquor produced is then transferred to the buffer tank or bioreactor 12 where further elemental sulfur may be added from a sulfur source 23 if required, and oxidized to sulfuric acid, by micro-organisms carried over from reactor 17 before re-addition to the contaminated material in the soil 1 in the manner described above (via the wells 8 and gallery 9 and sprayer 7).

The metal removal treatment process is therefore cyclical and metal contaminants in the portion 3 of the soil layer 1 are, during various cycles of the metal removal process, gradually leached by the leachate solution containing biochemically formed sulfuric acid and recovered as an insoluble sulfide formed in the bioprecipitation reactor 13. A proportion of the sulfur is recovered by oxidation of sulfides in the oxidation reactor 17 and is re-used in the soil acid leaching of metal contaminants.

While various embodiments of the present invention have been described in detail, it is apparent that modifications and adaptations of those embodiments will occur to those skilled in the art. It is to be expressly understood that such modifications and adaptations are within the scope of the present invention, as set forth in the following claims.

What is claimed is:

1. A process for the decontamination of a particulate medium contaminated with contaminants comprising one or more heavy metal species, the process comprising the steps of treating a body of the said medium with microbially produced sulfuric acid so as to solubilize the heavy metal species as metal sulfates; leaching out the metal sulfates; treating the leached metal sulfates by a bioprecipitation process which converts said sulfates to insoluble sulfides; separating said insoluble metal sulfides; converting said insoluble metal sulfides to hydrogen sulfide; separating said hydrogen sulfide produced during said bioprecipitation process from said insoluble metal sulfides; and biooxidizing the separated hydrogen sulfide to form a reusable source of sulfur.

2. A process as in claim 1 and wherein several metal species are present in the said medium and these are converted to various metal sulfates and subsequently bioprecipitated as various metal sulfides.

3. A process as in claim 1 and wherein said metal or metals include radioactive species.

4. A process as in claim 1 wherein the medium to be contaminated comprises a particulate material selected from the group consisting of soil, rock particles, dredgings, sediment, sludge, process residue, slag from a pyrolytic process and furnace dust.

5. A process as in claim 1 wherein the particulate material is treated by leaching with said microbially produced sulfuric acid.

6. A process as in claim 5 wherein said sulfuric acid is produced microbially in-situ in the material comprising the particulate material.

7. A process as in claim 5 wherein said sulfuric acid is produced in a separate bioreactor and is added to the material comprising the particulate material.

8. A process as in claim 5 wherein said medium is soil or land in-situ.

9. A process as in claim 1 wherein the insoluble sulfide or sulfides produced in the bioprecipitation process are extracted and encapsulated.

10. A process as in claim 1 wherein the process is operated cyclically.

11. A process for the decontamination of a particulate medium contaminated with one or more heavy metal species, the process comprising the steps of treating a body of said medium with microbially produced sulfuric acid so as to solubilize the metal species as metal sulfates; leaching out said metal sulfates; treating the leached metal sulfates by a bioprecipitation process which converts said sulfates to insoluble sulfides; converting said insoluble metal sulfides to hydrogen sulfide; separating hydrogen sulfide produced during the bioprecipitation from the insoluble metal sulfides, and recycling said hydrogen sulfide produced during said separating step in said process.

* * * * *